United States Patent
Gibbon et al.

(10) Patent No.: US 11,213,758 B2
(45) Date of Patent: Jan. 4, 2022

(54) METHODS, SYSTEMS, AND DEVICES FOR IDENTIFYING A PORTION OF VIDEO CONTENT FROM A VIDEO GAME FOR A PLAYER OR SPECTATOR

(71) Applicant: AT&T Intellectual Property I, L.P., Atlanta, GA (US)

(72) Inventors: David Crawford Gibbon, Lincroft, NJ (US); Jean-Francois Paiement, Sausalito, CA (US); Lee Begeja, Gillette, NJ (US); Jianxiong Dong, Pleasanton, CA (US); Tan Xu, Bridgewater, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 83 days.

(21) Appl. No.: 16/855,024

(22) Filed: Apr. 22, 2020

(65) Prior Publication Data
US 2021/0331072 A1   Oct. 28, 2021

(51) Int. Cl.
  A63F 13/86   (2014.01)
  A63F 13/61   (2014.01)
  G06N 20/00   (2019.01)
  A63F 13/87   (2014.01)

(52) U.S. Cl.
  CPC ............. *A63F 13/86* (2014.09); *A63F 13/61* (2014.09); *A63F 13/87* (2014.09); *G06N 20/00* (2019.01); *A63F 2300/5506* (2013.01)

(58) Field of Classification Search
  None
  See application file for complete search history.

(56) References Cited

U.S. PATENT DOCUMENTS

| | | | |
|---|---|---|---|
| 9,479,602 B1 * | 10/2016 | Paradise | A63F 13/798 |
| 2007/0117617 A1 * | 5/2007 | Spanton | A63F 13/12 463/29 |
| 2007/0265090 A1 * | 11/2007 | Barsness | A63F 13/61 463/42 |
| 2018/0250600 A1 * | 9/2018 | Trombetta | A63F 13/86 |
| 2021/0086089 A1 * | 3/2021 | Pardeshi | G06N 3/04 |

* cited by examiner

*Primary Examiner* — Jason T Yen
(74) *Attorney, Agent, or Firm* — Guntin & Gust, PLC; Atanu Das

(57) ABSTRACT

Aspects of the subject disclosure may include, for example, obtaining portions of video content from a video game from video game server(s) associated with a video game provider, selecting a first portion of video content from the portions of the video content, and providing the first portion to device(s) associated with viewer(s). Each device presents the first portion of the video content. Further embodiments include obtaining popularity information from the device(s) according to feedback based on presenting the first portion of the video content to the device(s), determining that the popularity information satisfies a popularity threshold associated with the video content, determining a subject matter corresponding to the first portion of the video content, and identifying a second portion of the video content from the video game to be recorded according to the subject matter. Other embodiments are disclosed.

20 Claims, 14 Drawing Sheets

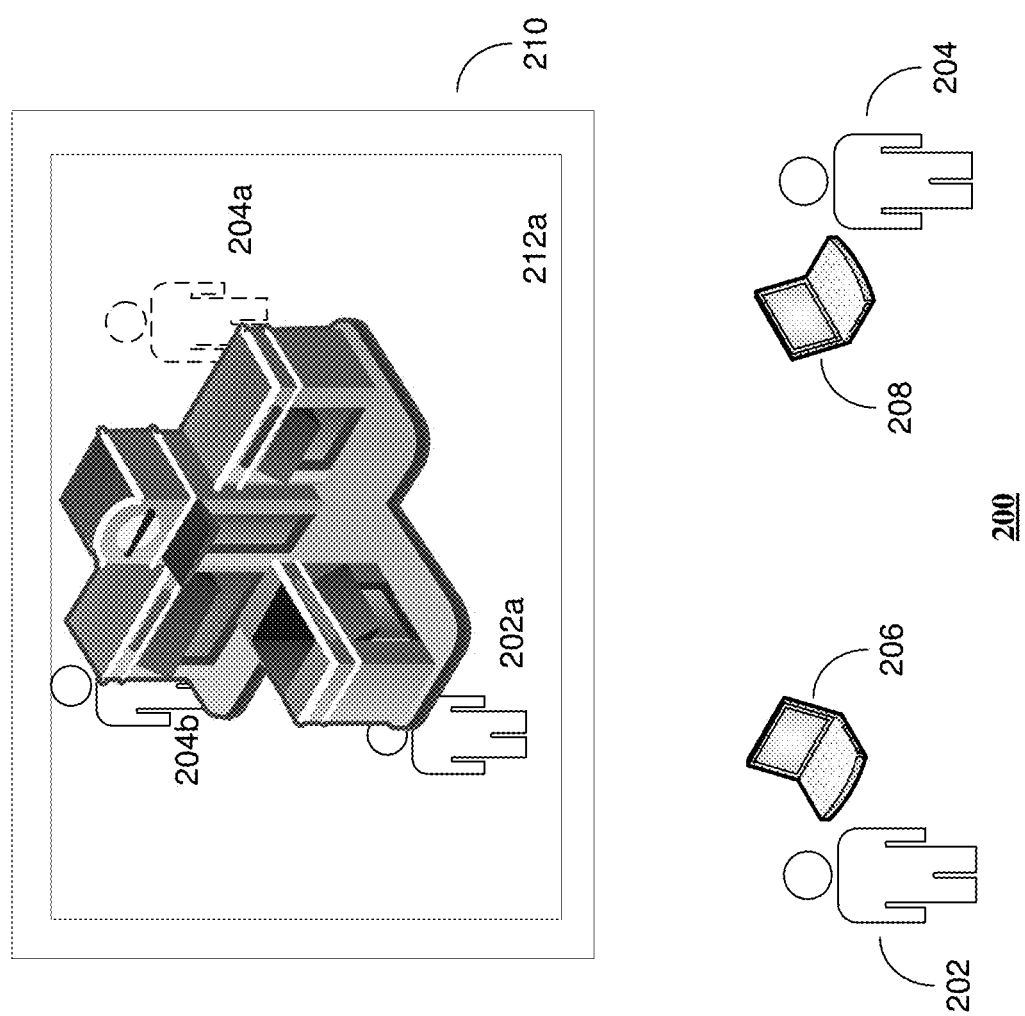

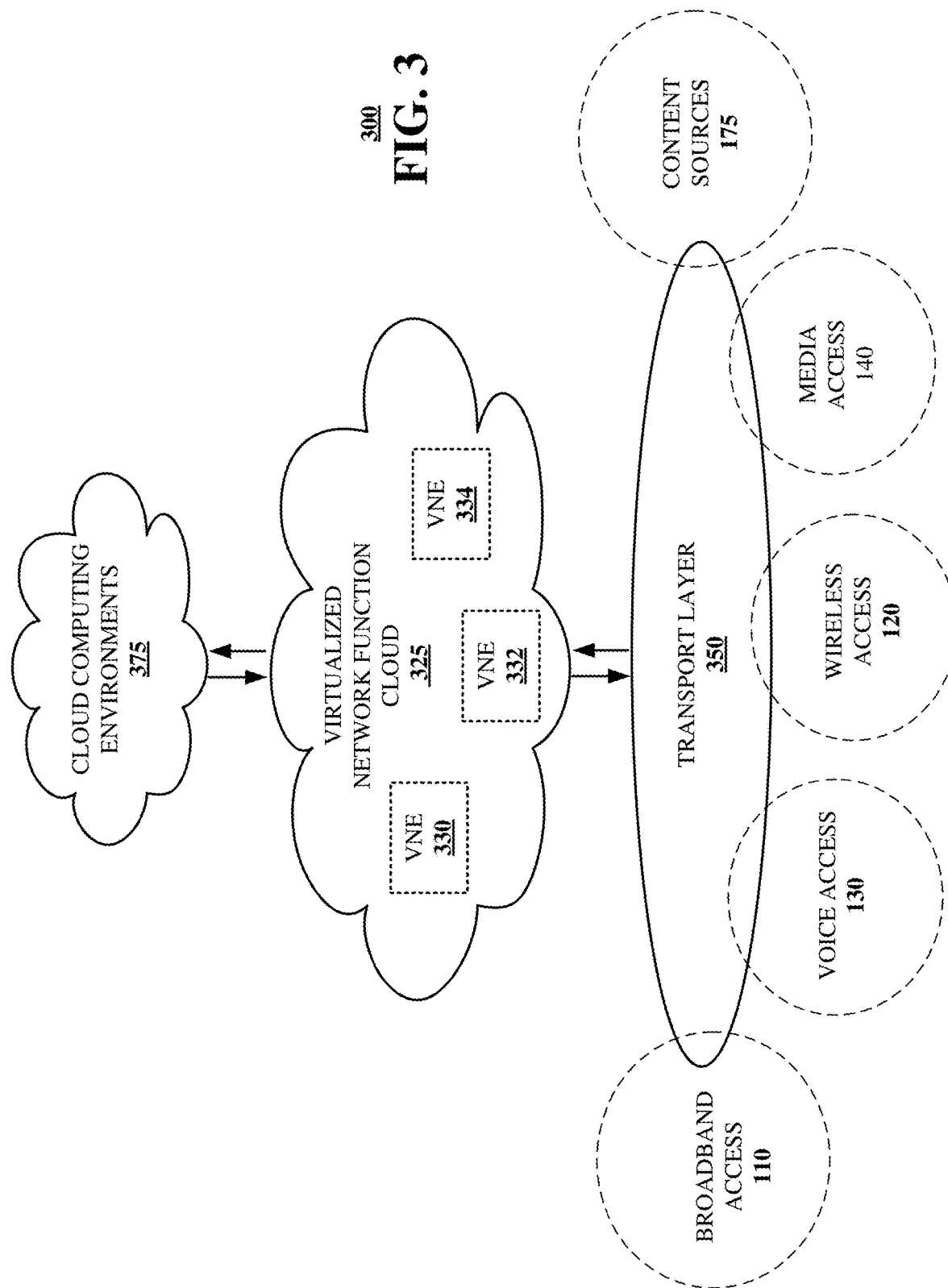

METHODS, SYSTEMS, AND DEVICES FOR IDENTIFYING A PORTION OF VIDEO CONTENT FROM A VIDEO GAME FOR A PLAYER OR SPECTATOR

FIELD OF THE DISCLOSURE

The subject disclosure relates to a methods, systems, and devices for identifying a portion of video content from a video game for a player or spectator.

BACKGROUND

Conventional video games can be played in an esports environment in which a video game is played in a video game arena (similar to a sports arena) and have a group of players compete against each other within the video game. Other players or spectators, either in person, or remotely over the Internet, can view the video game. Traditional targeted advertising can be provided to communication devices used by the players or spectators to view the video game based on player/spectator demographic information.

BRIEF DESCRIPTION OF THE DRAWINGS

Reference will now be made to the accompanying drawings, which are not necessarily drawn to scale, and wherein:

FIGS. 2A-2H are block diagrams illustrating an example, non-limiting embodiment of a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
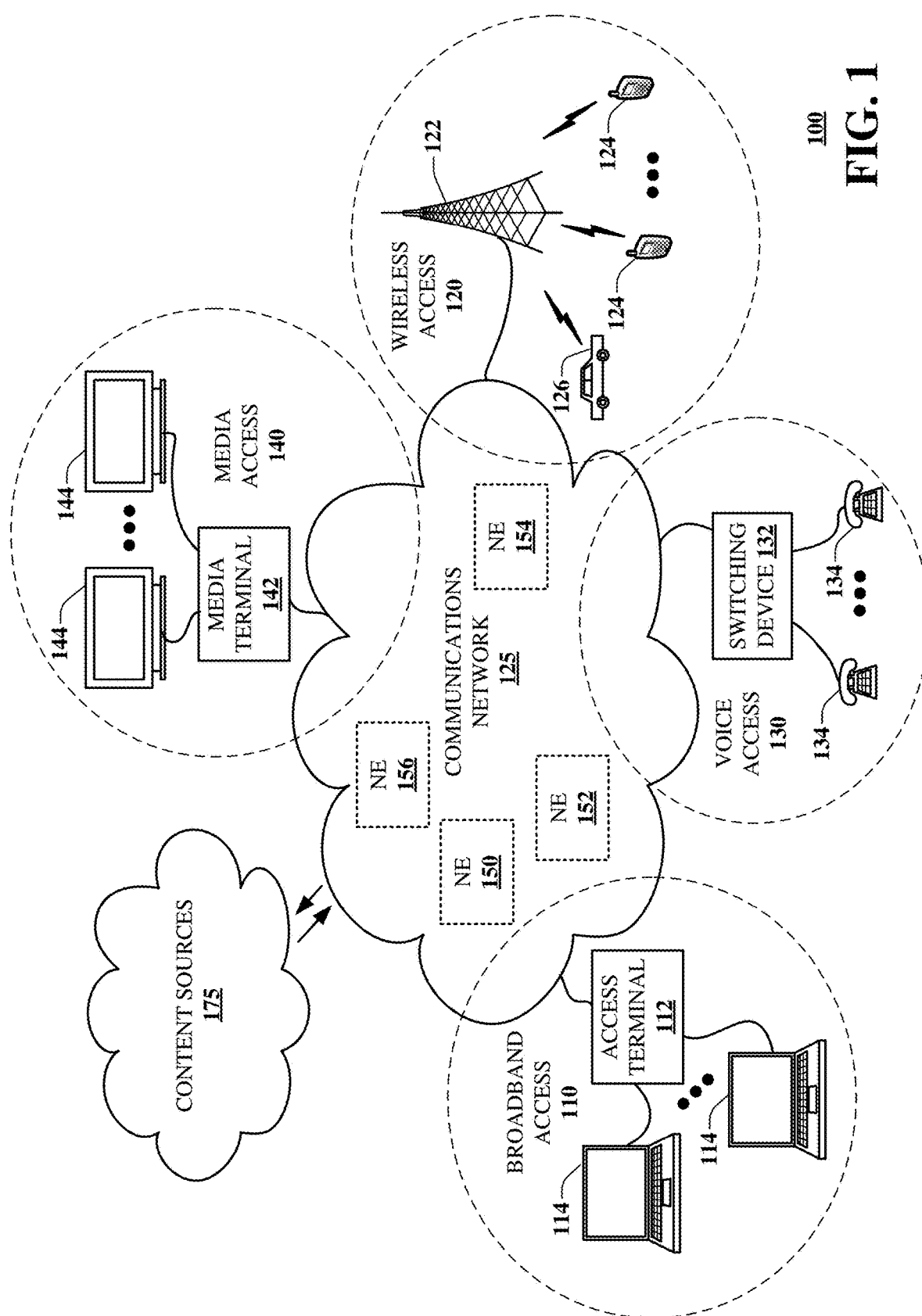
FIG. 1 is a block diagram illustrating an exemplary, non-limiting embodiment of a communications network in accordance with various aspects described herein.

The subject disclosure describes, among other things, illustrative embodiments for obtaining a plurality of portions of video content from a video game from a group of video game servers associated with a video game provider, selecting a first portion of video content from the plurality of portions of the video content, and providing the first portion of the video content to a group of devices associated with a group of viewers. Each device of the group of devices presents the first portion of the video content. Further embodiments comprise obtaining popularity information from the group of devices according to feedback based on presenting the first portion of the video content to the group of devices associated with the group of viewers, determining that the popularity information satisfies a popularity threshold associated with the video content, determining a subject matter corresponding to the first portion of the video content, and identifying a second portion of the video content from the video game to be recorded according to the subject matter. Other embodiments are described in the subject disclosure.

One or more aspects of the subject disclosure include a device, comprising a processing system including a processor, and a memory that stores executable instructions that, when executed by the processing system, facilitate performance of operations. Operations can comprise obtaining a plurality of portions of video content from a video game from a group of video game servers associated with a video game provider, selecting a first portion of video content from the plurality of portions of the video content, and providing the first portion of the video content to a group of devices associated with a group of viewers. Each device of the group of devices presents the first portion of the video content. Further operations can comprise obtaining popularity information from the group of devices according to feedback based on presenting the first portion of the video content to the group of devices associated with the group of viewers, determining that the popularity information satisfies a popularity threshold associated with the video content, determining a subject matter corresponding to the first portion of the video content, and identifying a second portion from the video content of the video game to be recorded according to the subject matter.

One or more aspects of the subject disclosure include a machine-readable medium, comprising executable instructions that, when executed by a processing system including a processor, facilitate performance of operations. Operations can comprise obtaining a plurality of portions of video content from a video game from a group of video game servers associated with a video game provider, selecting a first portion of video content from the plurality of portions of the video content, and providing the first portion of the video content to a group of devices associated with a group of viewers. Each device of the group of devices presents the first portion of the video content. Further operations can comprise obtaining popularity information from the group of devices according to feedback based on presenting the first portion of the video content to the group of devices associated with the group of viewers, determining that the popularity information satisfies a popularity threshold associated with the video content, determining a subject matter corresponding to the first portion of the video content, and identifying a second portion of the video content from the video game to be recorded according to the subject matter. Additional operations can comprise determining a characteristic of the subject matter based on the popularity information, and providing a first recommendation for a first adjustment to the video game to a first computing device associated with the video game provider based on the characteristic of the first portion of the video content, wherein the first computing device adjusts first video content of the video game to a second video content according to the first adjustment.

One or more aspects of the subject disclosure include a method. The method can comprise obtaining, by a processing system including a processor, a plurality of portions of video content from a video game from a group of video game servers associated with a video game provider, selecting, by the processing system, a first portion of the video content from the plurality of portions of the video content, and providing, by the processing system, the first portion of the video content to a group of devices associated with a group of viewers. Each device of the group of devices presents the first portion of the video content. Further, the method can comprise obtaining, by the processing system, popularity information from the group of devices according to feedback based on presenting the first portion of the video content to the group of devices associated with the group of viewers, determining, by the processing system, that the popularity information satisfies a popularity threshold associated with the video content, determining, by the processing system, a subject matter corresponding to the first portion of the video content, and identifying, by the processing system, a second portion of the video content from the video game to be recorded according to the subject matter. In addition, the method can comprise determining, by the processing system, a characteristic of the subject matter based on the popularity information, and providing, by the processing system, a first recommendation for an advertisement to a first computing device associated with an advertising entity based on the characteristic of the first portion of the video content. The advertising entity provides the advertisement based on the characteristic of the first portion of the video game to be presented within the video game.

Referring now to FIG. 1, a block diagram is shown illustrating an example, non-limiting embodiment of a system 100 in accordance with various aspects described herein. For example, system 100 can facilitate in whole or in part identifying a portion of the video content from a video game and providing the portion of the video content to a communication device of player or spectator of the video game. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIGS. 2A-2H are block diagrams illustrating an example, non-limiting embodiment of a system functioning within the communication network of FIG. 1 in accordance with various aspects described herein. As popularity of esports and video games continue to grow, so much as that video games are played in sports arenas viewed in person and remotely over the Internet (via streamed or recorded content) by spectators and players (e.g., players who previously played the video game or players that will play the video game in the future), both the players and spectators may have some challenges in finding items of interest (specific video games, strategies, weapons, objects, etc.) related to a video game or in finding which players are most engaging/entertaining from a video game. Conventional methods of finding items of interest or engaging/entertaining players rely on live/human annotation (e.g., an announcer) to actively view and identify points of interest. Further, conventional methods of grouping players rely on existing profiles and predetermined level (or experience) characterization to find engaging/entertaining players. In physical sports, this may be points per players, activities, etc. but for esports or video games it may be related to weapons, objects, scenarios (codified into the video game), strategies, and player prior experience. General content analysis can be applied to both physical sports and esports/video game via commonly-placed sensors and image capture systems but may not be robust in current video gaming and content platforms. The capabilities of content analysis within a machine learning system can be used to determine and predict when an interesting event may occur to better recruit, schedule, broadcast, etc. portions of video game content to players and spectators alike without advanced human input or deep human annotation.

Embodiments described herein include a system built on content analysis but using a combination of machine learned content representation (i.e. embedding) trained in an unsupervised/semi-supervised fashion and time sequence analysis for discovering portions of video content from a video game (e.g., gaming video sequences) of interest. Specifically, embodiments can include a ground-up embedding representation learning engine based on modeling sequences of video content (e.g., portions of video content from the video game) that determines the levels of similarity (co-occurrent actions, game events, actors, environments) and complementary nature (e.g. actions that happen in an order) that capture game semantics that are not directly expressible in visual or textual examples alone. The learned content representation can then be used to provide content recommendations, which can include identifying a sequence from a video game (e.g., portion of video content) composed of derived inputs (from video analysis), from the user of discrete input (from a controller), or other environment data (computer actions/objects). Further embodiments can include a recommendation engine that generates recommendations for a popular portion of the video content from the video game to provide to players, spectators, or video game content providers (e.g., content creators) by determining commonalities in activity of the portion of video content from the video game with another popular portion of video content from the video game instead of using annotation and metadata associated with points, profiles, and rankings. Additional embodiments can include using a portion-based representation such that a system can provide an automated record activity for easier interpretation of player history (scoring-like operations, friend/community like operations, etc.) without explicit annotation by a commentator or reviewer. Such a system can comprise a server, which can include the embedding learning engine and the recommendation engine.

One or more embodiments can include grouping individual game players to play each other with organic (or straight-forward and often player-driven) correlations beyond those that have safety/trust profiles that are well aligned (e.g., demographics, prior history, implied/verified trust). (Organic can be in the sense of groupings formed by known/existing organizational rules such as being friends, living in the same area, same demographics, etc. and can stage a premise for machine learning grouping). Further embodiments can include grouping game players by a method free of initial calibration/assessment because content similarity (skill level, activity, sequencing, et.) compared to creating other groups organically from the immediate group of people (e.g., grouping a crowd of spectators). Additional embodiments can include detection of exciting/popular portions of video content within a video game (by comparison to existing novelty among high-similarity portions of video content from the video game) to quickly convey to spectators or corral players with similar skills or situational state. Also, embodiments can include finding new audience segments (system can group both player and spectator) for content provider beyond previous static profiles (e.g., what was watched in what areas) that are specific to portions of video content within the video game. Further embodiments can include, for increased player engagement and satisfaction, finding the portions of video content from the video game that include players that are similar to a user (e.g., a spectator or player not currently playing the video game). Additional embodiments can also filter among broader set of players for specific portions of interest to the user (only watch highlights where the user was stuck or particularly interested in). Also, embodiments can include, for hosting platform, better engagement and advertising opportunity to plan events around the portions of interest or significance to users—not only for more user or different demographics, but also for understanding of the network and throughput needs (more players/viewers at this portion of the video content from the video game).

Referring to FIG. 2A, in one or more embodiments, two video game players 202, 204 can play a video game using video game systems 206, 208 (e.g., video game consoles) at a gaming venue that can be viewed by spectators or other players in person at the game venue or remotely via a communication device through a streaming service that streams the video game, or otherwise records then provides the recorded video game or portions thereof. A communication device can include a mobile device, mobile phone, smartpone, laptop computer, desktop computer, video game system, video game console, virtual reality device, augmented reality device, or a combination thereof. The video game can be hosted by a video game server, or a group of video game servers associated with a video game provider, that can be accessed by each of the players' video game system 206, 208. In some embodiments, a spectator or other player present at the gaming venue can view the video game over the streaming service, or received the recorded video game using a communication device. The gaming venue can include a display 210 can be viewed by spectators or other players present at the gaming venue (e.g., arena). The event of having the video game played between players 202, 204 at the gaming venue can be provided by a video game provider or some other promotional entity. Further, the display 210 can present a sequence or portion of the video content 212 from the video game. The portion of video content 212 can include avatar 204a, 204b, 202a of the players 202, 204. Avatar 202a can be associated with the player 202 and avatars 204a, 204b can be associated with player 204. The video game can be a combat game in which the objective is for players 202, 204 to kill each other's avatars, 202a, 204a, 204. In addition, the beginning of the portion of video content 212 can show that players 202, 204 position their respective avatars 202a, 204a diagonally across from each other nested in a group of buildings in an urban environment. However, by the end of the portion of video content 212 player 204 has positioned its avatar 204b closer to avatar 202a implementing a strategy of using the buildings cover so as to have a clearer shot at killing avatar 202a.

Figure 2B:
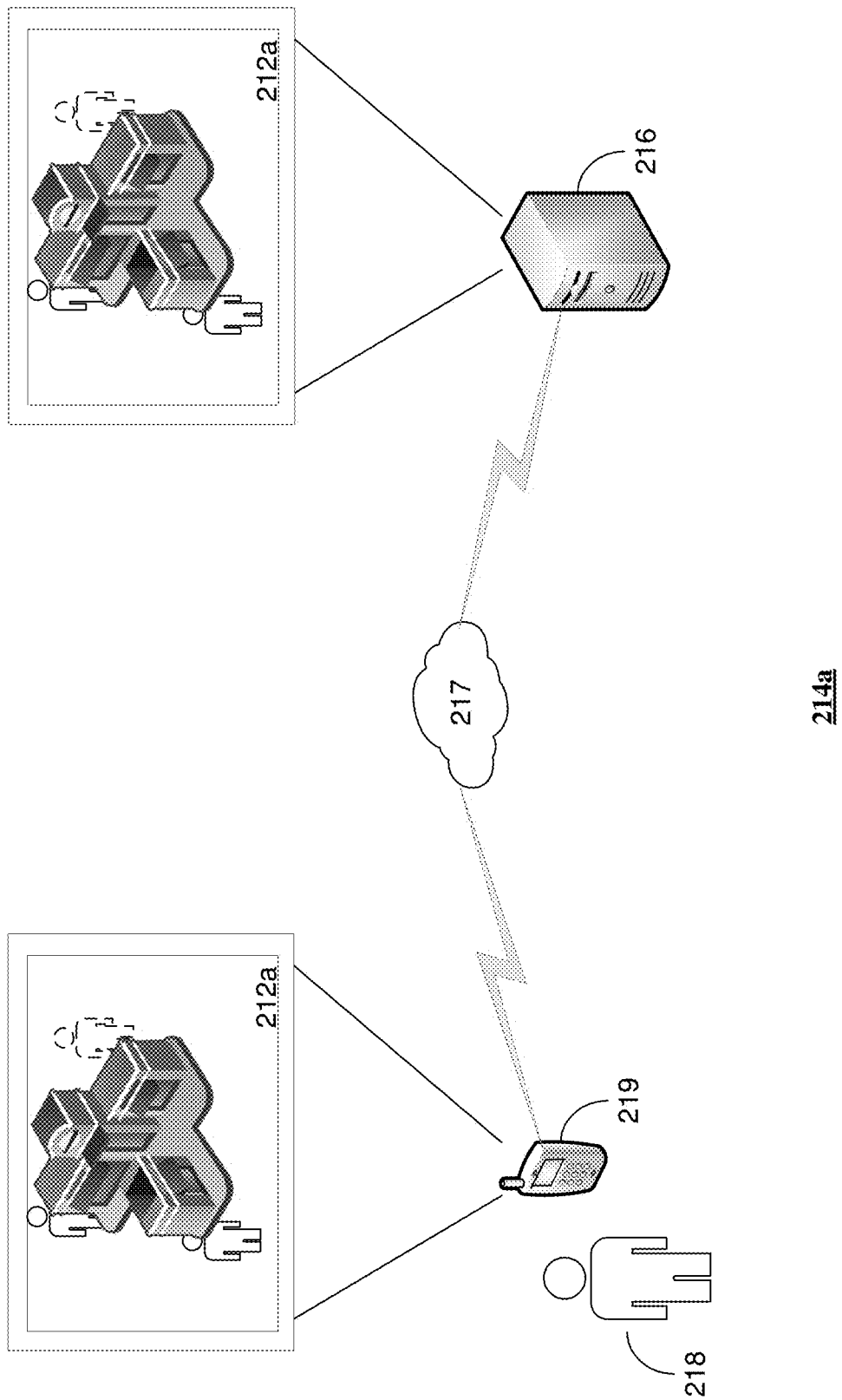

Referring to FIG. 2B, in one or more embodiments, a server 216 can be a video game server or a group of video game servers that host the video game between players 202, 204 at the gaming venue. In other embodiments, the portion of video content 212a from the video game can be streamed or otherwise and provided to a server 216 by a video game server or a group of video game servers. In further embodiments, the server 216 can obtain a plurality of portions of the video content from the video game from a group of video game servers. In addition, the server 216 can identify a first portion of video content 212a from the plurality of portions of video content and provide it to a group of devices associated with a group of viewers. The first portion of video content 212a can be the portion of video content 212a shown in FIG. 2A that include two avatars, each associated with a current player, among a group of buildings within an urban environment of the video game. Each device can present the first portion of video content 212a The communication device 219 can be one of the group of devices and user (who can be a spectator, previous player, or future player of the video game) can be one of the group of viewers. User 218 can provide feedback to server 216 via communication device 219. Feedback can be include social media type feedback that can include "liking", sharing, providing text comments, etc. regarding the portion of the video content 212a on a social media platform recorded and provided by the communication device 219 and provided to the server 216 over the communication network 217. Further, feedback can include the communication device 219 determining the user 218 viewing the portion of video content for a time period above a time threshold indicating that the user 218 found the portion of video content 212a interesting. Further, the communication device 219 can provide the viewing time of the user 218 or an indication the user viewed the portion of the video content 212a over a time threshold to the server 216 over communication network 217. Other feedback can include the communication device 219 determining the storing or bookmarking of the portion of video content 212 and providing an indication of such to the server 216 over the communication network 217. In addition, feedback can include providing voice annotations to the portion of the video content to be stored or shared on a social media platform, which can be provided by the communication device 219 to the server 216 over communication network 217. Feedback from all viewers of the portion of video content can be provided to server 216 by each viewer's respective device. Collectively, the feedback from all viewers can be called the popularity information.

In one or more embodiments, server 216 can determine that the popularity information satisfies a popularity threshold. The popularity information can include a group of popularity metrics. Examples of popularity metrics can include the number of "likes," shares, or comments regarding the portion of video content 212a on a social media platform is above a threshold (collectively or individually). Other examples of popularity metrics can include that a group of viewers each have viewed the portion of video content 212a over a time threshold. Further examples of popularity metrics can include a number of viewers that have stored or bookmarked the portion of video content 212a is above a threshold. In some embodiments, the popularity information satisfying a popularity threshold can include one or more popularity metrics satisfying one or more corresponding thresholds.

In one or more embodiments, the server 216 determines the subject matter of the portion of the video content 212a. For example, that the server 216 can determine, based on the popularity information, that a player using cover of different buildings to creep closer to an opposing player in a combat video game was the reason for its popularity. The popularity information can include social media comments that indicate viewers finding the subject matter interesting, for example. Thus, the server 216 can determine that the subject matter in the portion of video content 212a and that the subject matter may be of interest to user 218. In one example, the server 216 can determine that the subject matter, which includes a strategy of using cover to creep closer to an opposing player, was the aspect of the portion of the video content that was popular because the server 216 determines that the user 218 can be a previous player that had used a similar strategy when playing the video game. In another example, the server 216 can determine that the strategy aspect of the portion of the video content 212a is popular because the server 216 determines that the user 218 can be a spectator that had viewed portions of other video games in which players implemented a similar strategy.

Figure 2C:
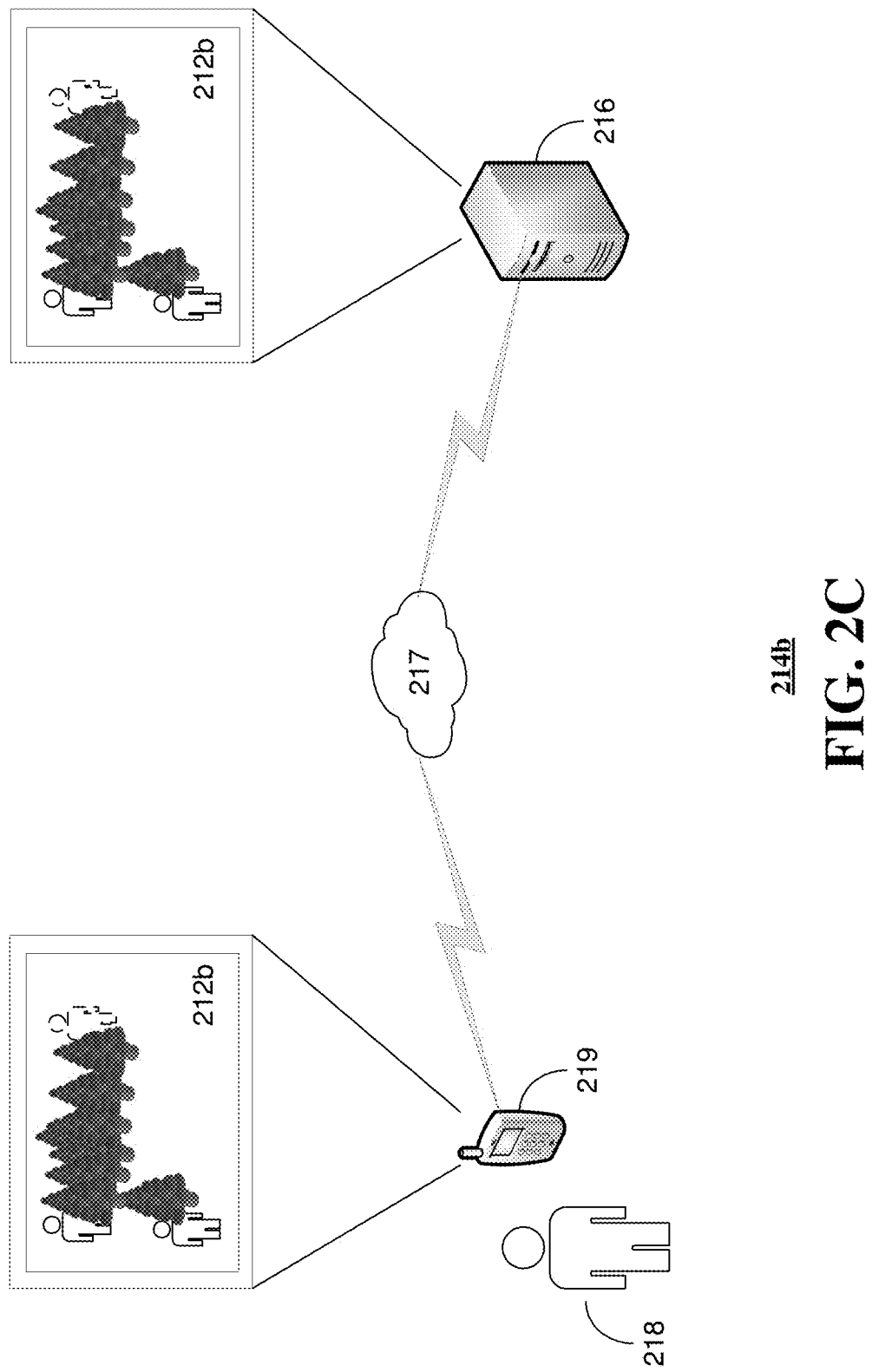

Referring to FIG. 2C, in one or more embodiments, the server 216 can identify a second portion of the video content 212b from the video to be recorded according to the subject matter of the portion of video content 212a. The subject matter can include a combat video game in which one player uses cover to creep their avatar closers to an opponent's avatar to engage in combat. For example, the second portion of the video content 212b can include two players in a forest environment in which one player uses the cover of trees to creep closer to the other player to engage in combat. Further, the server 216 can provide the second portion of the video content 212b to the communication device 219 over the communication network 217. In some embodiments, the server 216 can identify a user 218 associated with communication device 219. User 218 can be a player of the video game, not currently playing the video game, but associated with the characteristic of the portion of the video content 212a of the video game. A characteristic can be the strategy implemented by one player in the video game during the portion of video content. For example, the server 216 may have recorded the play of user 218 when it plays combat video games (including the current combat video game) to determine one of its preferred strategies, which can be to utilize a similar strategy of using cover to creep closer to an opposing player in a combat video game. Thus, the server 216 can determine that the strategy used by player 204 in the first portion of the video content 212a and that the strategy is related to one implemented by user 218, the server 216 can provide, over communication network 217, the second portion of the video content 212b to the communication device 219 associated with the user 218 because the user 218 may be interested in viewing the strategy of second portion of the video content 212b, accordingly. In other embodiments, the user 218 can be spectator or otherwise interested in the video game for which the server 216 determines that the second portion of the video content 212b would be of interest to the user 218 as a spectator, as the spectator enjoy players of video game implementing the strategy of using cover to engage in combat. Note, communication network 217 can comprise wired communication networks, wireless communication networks, or a combination thereof.

Figure 2D:
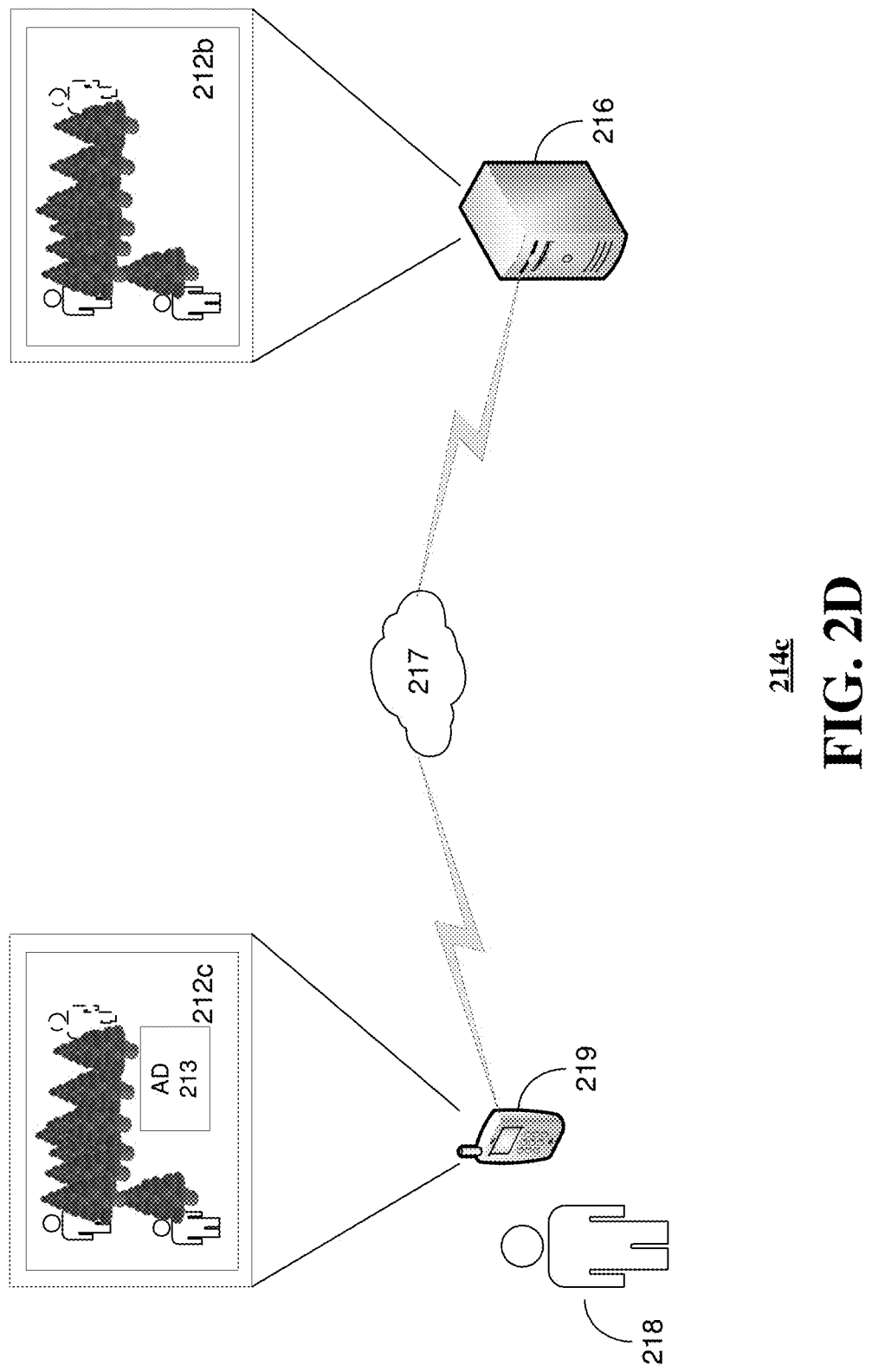

Referring to FIG. 2D, in one or more embodiments, the server 216 can determine a characteristic of the subject matter based on the popularity information. The characteristic of the first portion of the video content 212a can be associated to one of a current player of the video game, a strategy of the video game, a weapon of the video game, an object of the video game, a tactic of the video game, a group of controls of the video game, a popularity of first portion of the video content, or a combination thereof. In further embodiments, the server 216 can generate a recommendation for an advertisement 213 based on the characteristic. For example, if the characteristic is the strategy of using cover in a combat video game, then the advertisement 213 can be for another combat video game that a player can implement the strategy. In additional embodiments, the server 216 can provide the recommendation for an advertisement 213 to a computing device associated with an advertising entity. The advertising entity can be the video game provider or can be a third party entity. The computing device associated with the advertising entity can provide the advertisement 213 based on the characteristic to be presented within the second portion of the video content 212c from the video game. In some embodiments, the advertisement 213 can be provide by the computing device associated with the advertising entity to the server 216, which can then insert the advertisement 213 into the second portion of the video content 212c when providing the second portion of the video content 212c to communication device 219 over communication network 217. In other embodiments, the advertisement can be provided to the communication device 219 by the computing device associated with the advertising entity, and the communication device 219 can insert the advertisement 213 into the second portion of the video content 212c. In additional embodiments, the computing device associated with the advertising entity can provide the advertisement 213 to a group of video servers to be presented during the video game between players 202, 204.

Figure 2E:
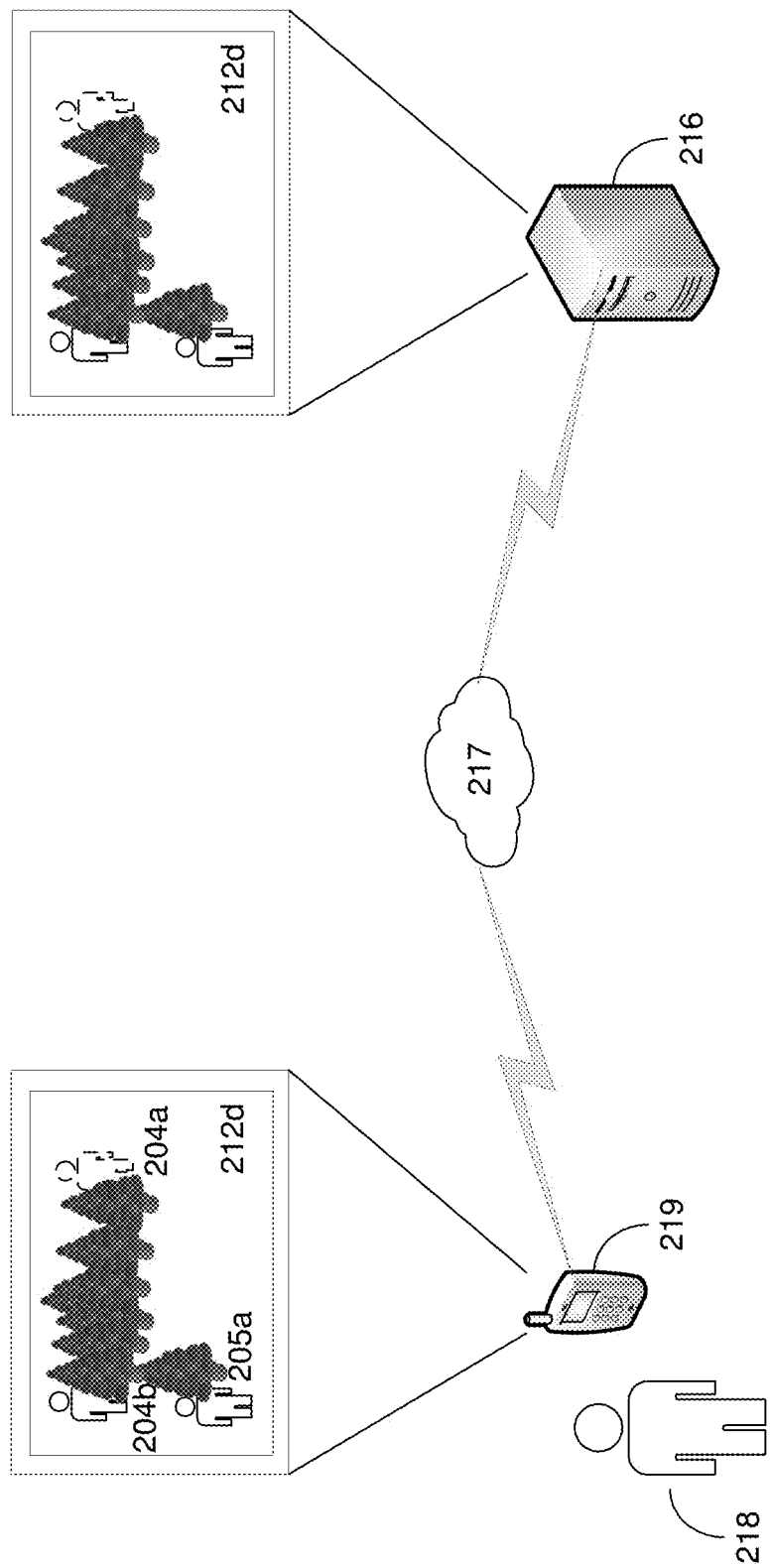

Referring to FIG. 2E, a server 216 can identify the players 202, 204 associated with the first portion of video content 212 and provide a recommendation to a video game provider hosting the video game for an adjustment to the video game based on having one of the players 202, 204 associated with the first portion of the video content 212. For example, the video game provider can host another video game with player 204 playing against another player associated with an avatar 205a. The recommendation can include an indication to include player 204 in upcoming video games because of the exciting strategy implemented by player 204 or any other characteristic related with the player 204 that indicated in making the first portion of the video content 212 popular such that the popularity information garnered from it satisfied the popularity threshold. Further, the server 216 can obtain another portion of the video content 212d from the upcoming video game that includes the avatars 204a, 204b, 205a with avatars 204a, 204b implementing the strategy identified in first portion of the video content 212 and provide, over communication network 217, this other portion of the video content 212d to communication device 219 to be presented to the user 218.

Figure 2F:
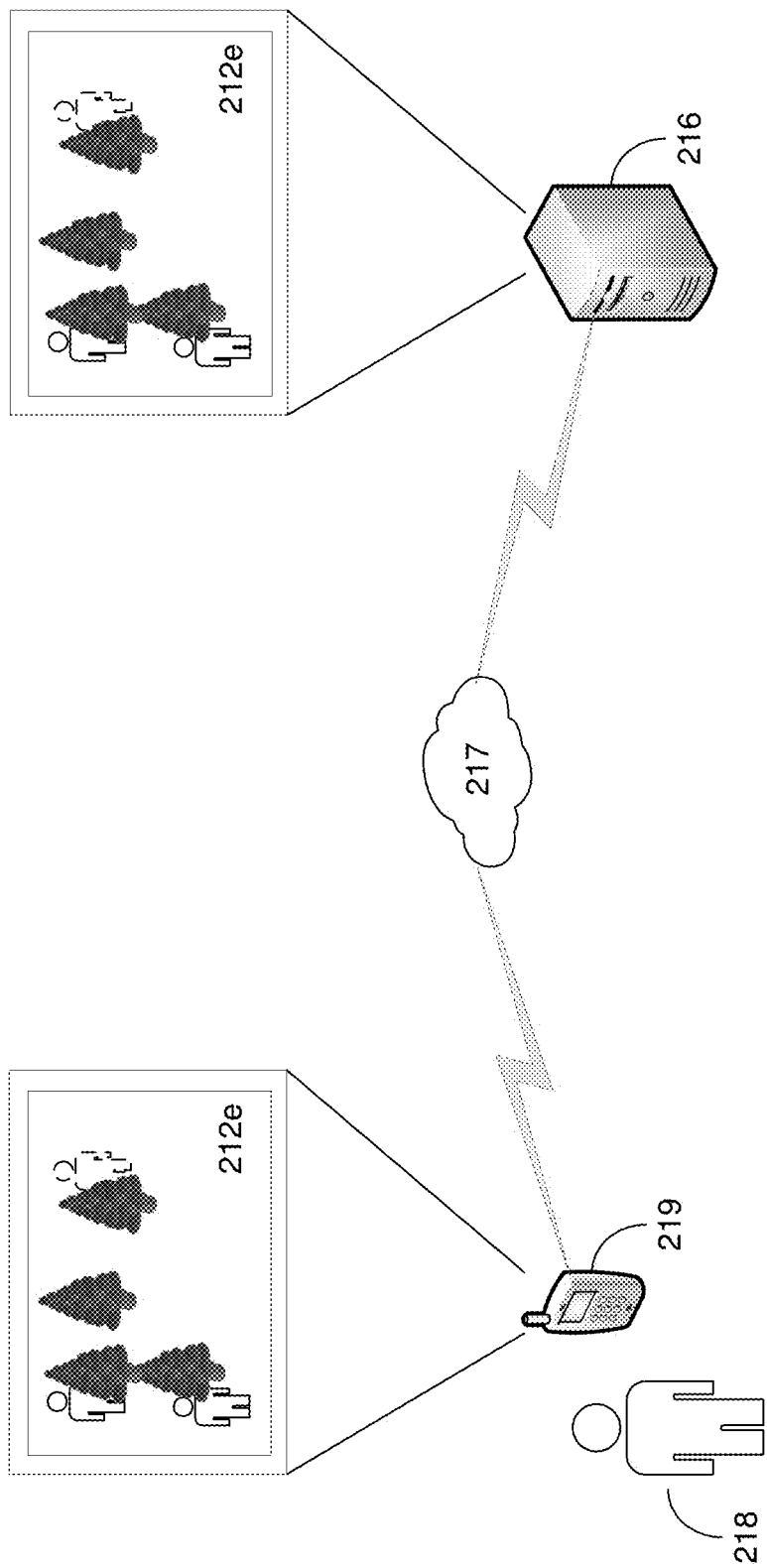

Referring to FIG. 2F, in one or more embodiments, the server 216 can provide a recommendation for an adjustment to the video game, over a communication network 217, to a computing device associated with the video game provider based on the characteristic of the first portion of the video content 212. For example, the recommendation can be to not provide such a dense forest of trees within a portion of the video game so that player 204 cannot easily use it for cover because it provides too much of a competitive advantage to player 204 over player 202. In response, the video game provider can adjust the content of the video game from a video content that includes a more dense forest to use for cover to content that includes a less dense forest to decrease the competitive advantage to player 204 and provide a more competitive video game between the players 202, 204. Such a portion of video content 212e from the video game which in turn can be provided to communication device 219, over communication network 217, to be viewed by user 218. (the video game can have both an urban environment as in the first portion of the video content 212a and a forest environment as in the portion of the video content 212e). The adjustment to the video game, can be to the current session of the video game or can be to a future session of the video game between players 202, 204. In other embodiments, the video game provider can adjust a content of a video game that does not have cover for a player to content that does have cover so that the player can implement the strategy discerned from the first portion of video content 212a from the video game.

Figure 2G:
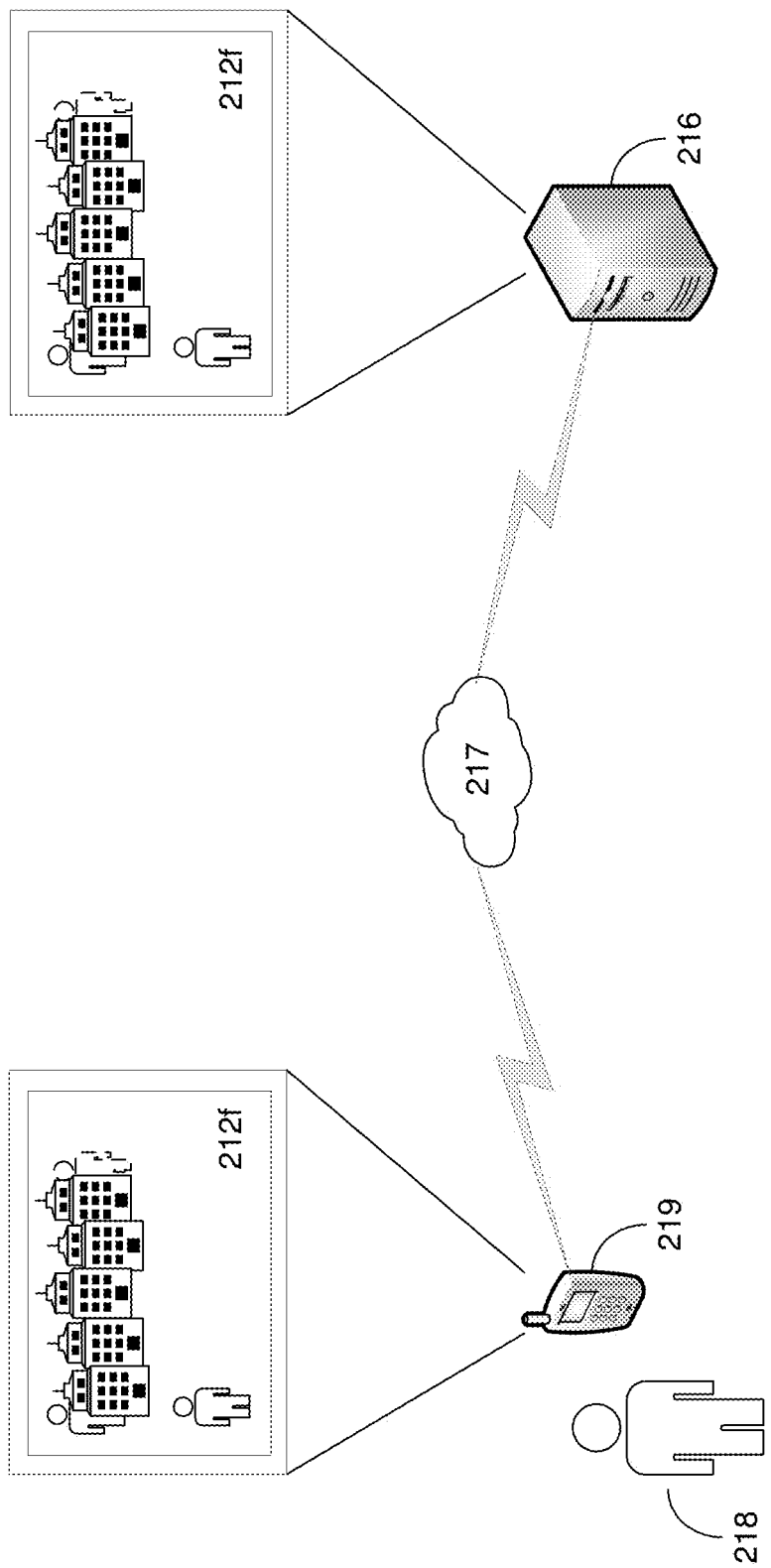

Referring to FIG. 2G, in one or more embodiments, the server 216 can identify a portion of the video content 212f from the video game based on the subject matter or characteristic of the first portion of the video content 212. For example, the portion of the video content 212f can show a player of the current video game and its respective avatar using buildings as cover in a different portion of the video game (in a different urban environment) implementing a similar strategy of using cover. In some embodiments, the portion of video content 212f can be a portion of a different video game but still has at least one player implement a strategy related to the strategy used in the first portion of the video content 212 The portion of video content 212f can be provided, over communication network 217, to the communication device 219 to be presented to user 218. In some embodiments, the server 216 can use one or more machine learning techniques to identify the different portions of video content 212b, 212c, 212d, 212e, 212f.

Figure 2H:
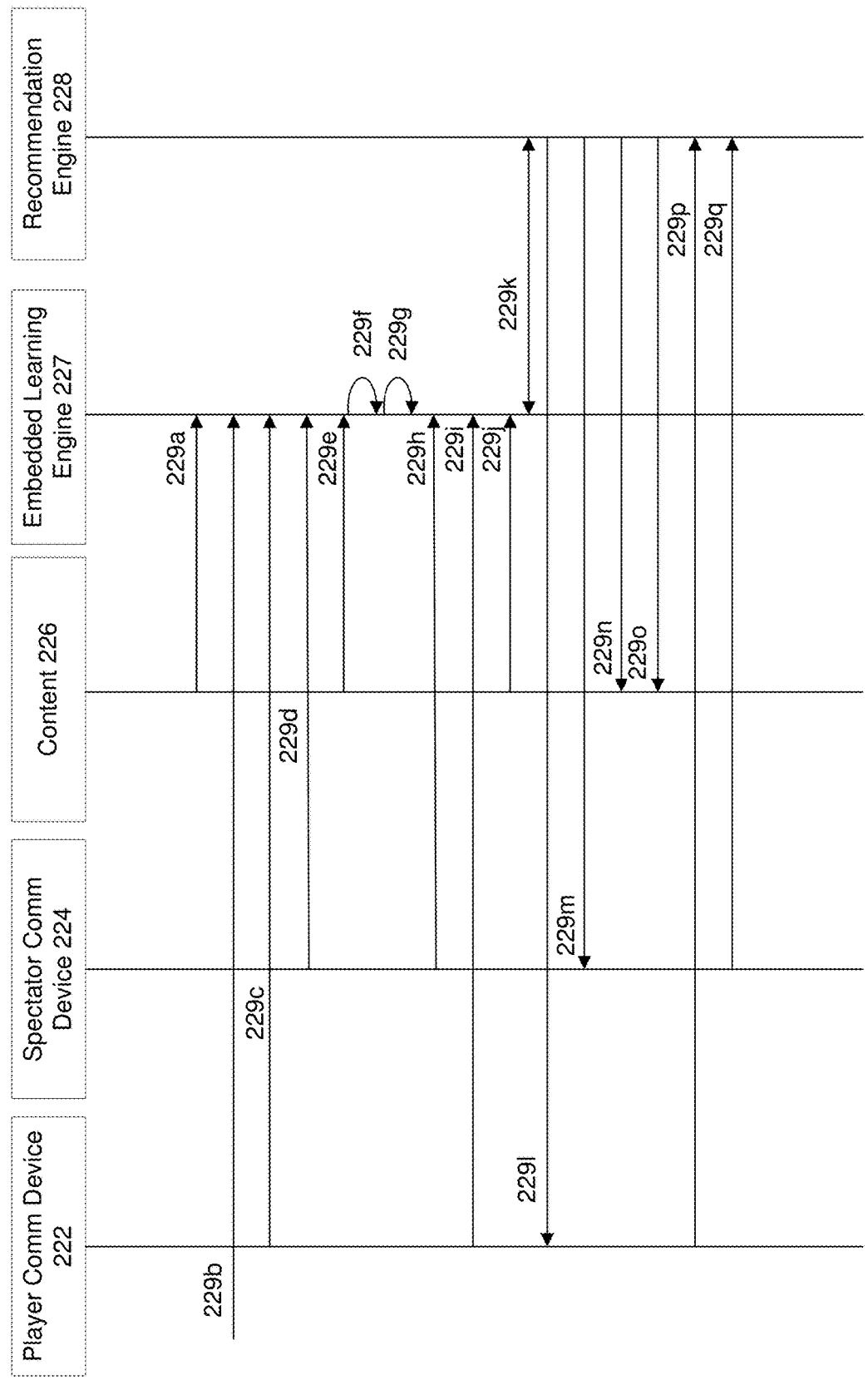

Referring to FIG. 2H, in one or more embodiments, a system 220 can include a player communication device 222, a spectator communication device 224, content 226 (e.g., video game content) provided by a server (e.g., video game server(s)), embedding learning engine 227, and recommendation engine 228. A server such as server 216 in FIGS. 2B-2G can include the embedding learning engine 227 and recommendation engine 228. Further, the server can host or store the content 226 or otherwise obtain the content 226 from a group of servers that host the content 226. A player associated with the player communication device 222 can be a current player of the video game or a player that has played or indicated will play the video game in the future but is not currently playing the video game. In some embodiments, a player communication device 222 can represent a group of player communication devices associated with a group of players. In other embodiments, a spectator communication device 224 can represent a group of spectator communication devices associated with a group of spectators.

In one or more embodiments, the embedding learning engine 227 can interact with the content 226 to obtain and identify different portions of video content from a video game currently being played among a group of players. Embedding learning can also be called unsupervised/semi-supervised representation (machine) learning. This can include understanding a physical representation of the player within the content 226 (e.g., avatar) and action determined via additional object/skeleton recognition or via direct video game inputs (e.g., button presses, etc.) by analyzing a recorded or time-delayed video game stream. In other embodiments, the embedding learning engine 227 can help to identify the state of the game as determined by the recorded/time-delayed video game stream and state of inputs to the video game. Inputs can include direct inputs (keyboard, mouse, joystick, etc.) or indirect inputs (textual comments, environment data, etc.). Further, the embedding learning engine 227 can provide a player feed (audio or video of face/body). In addition, the embedding learning engine 227 can help to identify the time of play (e.g., time of day, player's experiences, etc.) and the diversity of playing conditions. Also, the embedding learning engine 227 can integrate feedback from spectators or players (via their respective communication devices 222, 224) to reweigh the meaning of an activity (e.g., is the activity unusual/abnormal, is the activity effective for the put of the video game/scenario, and what is the audience sentiment caused by the activity). Further, the aspects of the video game can be learned by the embedding learning engine 227 by analyzing content from a repository of recorded video game sessions or prior video game play.

In one or more embodiments, the embedding learning engine 227 can help to describe event structure of different portions of video content from a video game. This can include using the learned embedding to align/connect different portions of video content from the video game according to their semantics. Further, this can include performing segmentation of content using metadata, video game input, etc. into events from individual portions of video content from the video game. Alignment of portions of video content from the video game can use algorithms such as dynamic programming, clustering, fixed quantization, earth mover, hierarchical, etc.

In one or more embodiments, the embedding learning engine 227 can include computing similarity of events for matches that can be used for recommendations. This computation can utilize preference/affinity from spectators, viewership/sentiment for event, similarity of player, engagement in system by similar players present, profile and co-players to augment recommendations, similarity of events with portions of the video content syntax such as event structure (e.g., A, B, C vs, X, Y, Z, W—monster defeat Scenario 1 (obtain sword, defeat underling, destroy castle) and monster defeat Scenario 2 (obtain sword, defeat underling, destroy castle, collect bounty)—the event structure of Scenario 1 and Scenario 2 are similar). In addition, computing similarity of events can include computing complementary nature of portions of video content (e.g., A, B, C, D, vs. X, Y Z, W—making sandwich Scenario 1 (slice bread, apply mustard, slice meat, toast) and making sandwich Scenario 2 (slice bread, slice meat, toast, apply mustard)—Scenario 1 and Scenario 2 are similar but their events can be in a different order). Also, the computing similarity of events can be based on game-based strategy. This can include inference from player performance in similar games, correlate with purchase/game actions, and explicit score feedback.

In one or more embodiments, the embedding learning engine 227 can provide data and information such as portions of video content from the video game to the recommendation engine 228 to propose recommendations for overall engagement. This can include recommendations regarding players, spectators, and the video content provider. With regard to players, recommendations can include novel player grouping/teams, player portions of video content to execute (e.g. tutorial for a certain player's move or strategy within the video game), and suggest new competitions with competitive award/bracket. With regard to the spectator, a recommendation engine 228 can suggest or provide content or a summary of the content to be viewed by the spectator. With regard to the content providers, the recommendation engine 228 can provide the discovery of "pain-point" portions of video content from the video game that are not viewed or interested by other players or spectator, recommend advertising opportunities, and recommend interesting content or narrative changes. In some embodiments, the recommendation engine 228 can suggest structural changes to the video game user interface such as adding a dashboard for direct user interaction, audit, or automatic event browsing. In other embodiments, the recommendation engine 228 can augment a recommendation in response to receiving implicit or explicit feedback from players, spectators, or content providers.

In one or more embodiments, the embedding learning engine 227, at 229a, can help to retrieve historical examples of different portions of video content from the video game from the content 226 obtained from a group of video game servers. Further, the embedding learning engine 227, at 229b, can help to retrieve game-state mechanics from a server (that may or may not be within the system 220). In addition, the embedding learning engine 227, at 229c, can integrate a video feed or other passive biometrics from the player communication device 222, which the player uses to play the video game. Also, the embedding learning engine, at 229d, can obtain a video feed or other passive biometrics from the spectator communication device 224, which the spectator uses to view the video game. Further, the embedding learning engine 227, at 229e, can obtain time, seasonal, and conditional information from analyzing the content 226 of the video game (using image recognition techniques). In addition, the embedding learning engine 227, at 229f, can help to compute event alignment for one or more portions of video content from the video game. Also, the embedded learning engine 227, at 229g, can compute event segmentation for one or more portions of video content from the video game.

In one or more embodiments, the embedding learning engine 227, at 229h, can obtain or learn the event-based preference by viewership or social sentiment from the spectator communication device 224. Further, the embedding learning engine 227, at 229i, obtain the similarity of players or determine a social graph of players from a group of player communication devices 222. In addition, the embedding learning engine 227, at 229j, can determine complementary or similar events within other portions of video content from the video game from the content 226. The recommendation engine 228 in concert with the embedding learning engine, at 229k, can recommend a game strategy from the events within the similar/complementary portions of video content from the video game. Further, the recommendation engine 228, at 229l, can recommend unique grouping of players (teams), a teaching portion of video content and associated walkthrough tutorial of the maneuvers within the teaching portion of video content, and new competitions to the player communication device 222. In addition, the recommendation engine 228, at 228m, can recommend portions of video content from the video game to view based on the viewership of other spectators, or other players to the spectator communication device 224. Also, the recommendation engine 228, at 228n, can recommend to the video content provider or an advertising entity associated with the video content provider advertisement opportunities within different potions of video content from the video game. Further, the recommendation engine 228, at 229o, can recommend change to the video game to change its narrative to the video game provider that provides/presents the portion of the video content. In addition, the recommendation engine 228, at 229p and 229q, can receive feedback on its recommendations from both the player communication device 222 and the spectator communication device 224.

Figure 2I:
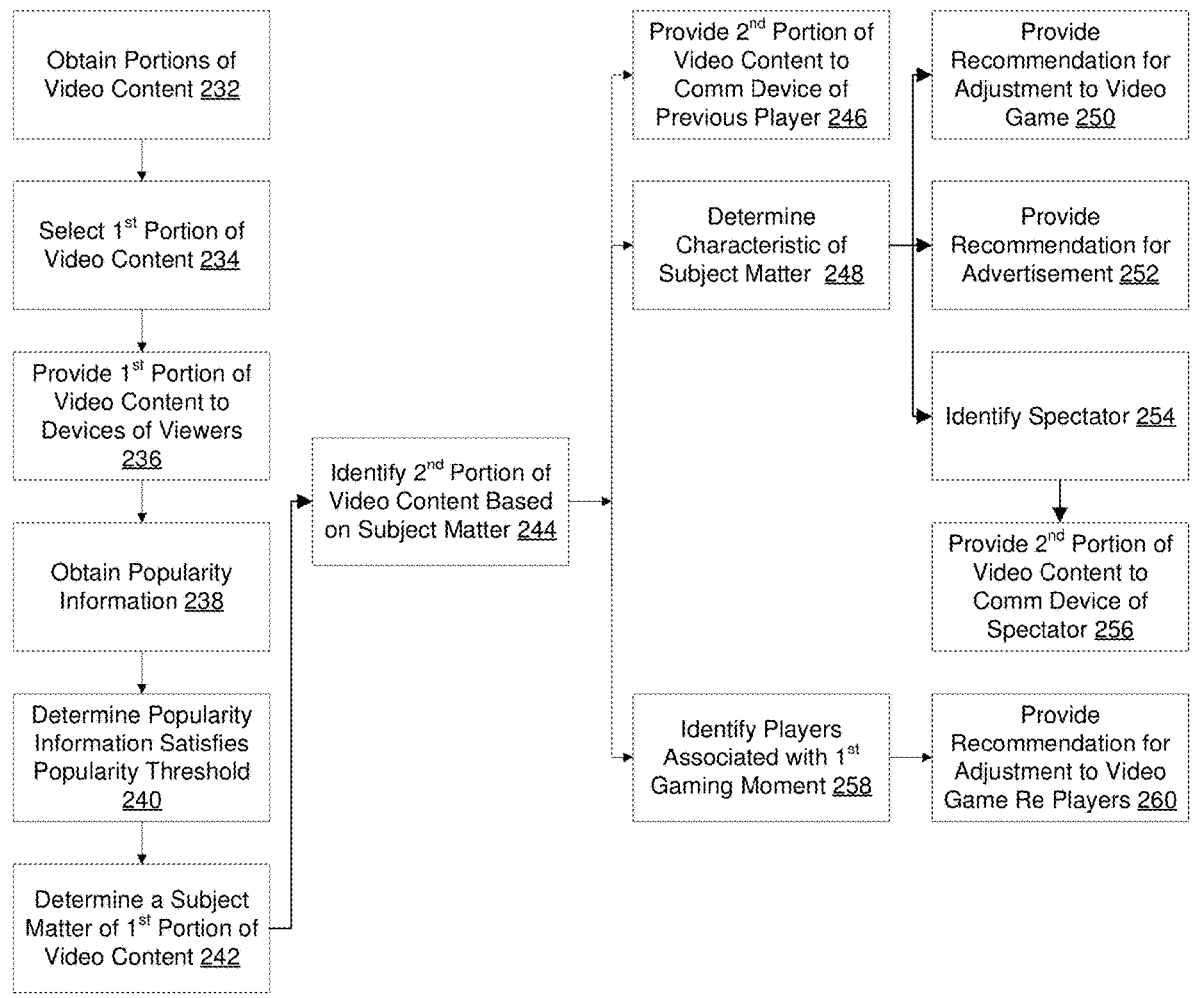
FIG. 2I depicts an illustrative embodiment of a method in accordance with various aspects described herein.

FIG. 2I depicts an illustrative embodiment of a method 230 in accordance with various aspects described herein. In one or more embodiments, aspects of method 230 can be implemented by a server as shown in FIGS. 2B-2G. The method 230 can include the server, at 232, obtaining a plurality of portions of video content from a video game from a group of video game servers associated with a video game provider. Further, the method 230 can include the server, at 234, selecting a first portion of video content from the plurality of portions of the video content. In addition, the method 230 can include the server, at 236, providing the first portion of the video content to a group of devices associated with a group of viewers. Each device of the group of devices presents the first portion of the video content. Also, the method 230 can include the server, at 238, obtaining popularity information from the group of devices according to feedback based on presenting the first portion of the video content to the group of devices associated with the group of viewers. Further, the method 230 can include the server, at 240, determining that the popularity information satisfies a popularity threshold associated with the video content. In addition, the method 230 can include the server, at 242, determining a subject matter corresponding to the first portion of the video content. Also, the method 230 can include the server, at 244, identifying a second portion of the video content from the video game to be recorded according to the subject matter. In some embodiments, the identifying of the second portion of the video content comprises identifying the second portion of the video content using a machine learning technique.

In one or more embodiments, the method 230 can include the server, at 246, providing the second portion of the video content to a first communication device of a previous player of the video game. Further, the method 230 can include the server, at 248, determining a characteristic of the subject matter based on the popularity information. The characteristic of the first portion of the video content can be associated to one of a current player of the video game, a strategy of the video game, a weapon of the video game, an object of the video game, a tactic of the video game, a group of controls of the video game, a popularity of first portion of the video content, or a combination thereof. In addition, the method 230 can include the server, at 250, providing a first recommendation for a first adjustment to the video game to a first computing device associated with the video game provider based on the characteristic of the first portion of the video content. In some embodiments, the first computing device adjusts first video content of the video game to a second video content according to the first adjustment. Also, the method 230 can include the server, at 252, providing a second recommendation for an advertisement to a second computing device associated with an advertising entity based on the characteristic of the first portion of the video content. The advertising entity provides the advertisement based on the characteristic of the first portion of the video content to be presented within the video game. Further, the method 230 can include the server, at 254, identifying a spectator of the video game based on the characteristic, and, at 256, providing the second portion of the video content to a second communication device associated with the spectator.

In one or more embodiments, the method 230 can include the server, at 258, identifying a group of players associated with the second portion of the video content. Further, the method 230 can include the server, at 260, providing a third recommendation to a third computing device associated with the video game provider for a second adjustment to the video game based on a portion of the group of players associated with the first portion of the video content.

While for purposes of simplicity of explanation, the respective processes are shown and described as a series of blocks in FIG. 2I, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Further portions of embodiments described herein can be combined with portions of other embodiments described herein.

One or more embodiments can include quantifying the user experience (at different level, different amount of graphic/violence exposure) and associate that with "screen time," such that too much violent content would be cut short compared to other moderate content and also encourage moderation in gameplay and participation. Further embodiments can include utilizing portion of the video content from the video game based determination, propose recommendation for advertisements to advertising entities, bridging external consumption (e.g. viewership of content) and portions of video content activity in video games. Additional embodiments can allow sponsors to select which types of portions of the video content can be chosen (possibly rewarded) for sponsorship and branding opportunities. Also, embodiments can include using other data-to-text to generate biographies of players with labeled data, automated summaries, text descriptions, or visual representations of players can be generated by using synthesis technologies, such as Generative Adversarial Networks (GANs) to augment gameplay/enjoyment. Further embodiments can include a system that can dynamically reconfigure environment conditions (e.g., provide them to game engine to create a portion of video content from the video game) that may attract specific players or spectators to that event, similar to stimulating an exciting/popular portion of the video content from the video game or convert other viewers into players.

One or more embodiments can include generating a recommendation based on portions of the video content from the video game (and players) instead of static player statistics. Further embodiments can include different representations of video game content for learning can generate recommendations of players and portions of the video content for video gaming. Additional embodiments can include a system that allows for automated record of activity for easier interpretation of portions of video content from the video game and association with players, significant as video games become more abstract and the annotation of these events become more costly. Also, embodiments can include automatic construction of player profile that is interpretable external, predictive method for determining player type for a player for audience activities to predict how many "exploring" types, how many are more aggressive, where/when these activities occur most. Further embodiments can include player history (scoring-like operations, friend/community-like operations, etc.) without explicit annotation by a commentator or review. Additional embodiments can include an automated player guide using co-occurrence of portions of the video content from the video game and frequency of "success," agents can guide new players for acquiring different skills or upgrades.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A-2G, and 3. For example, virtualized communication network 300 can facilitate in whole or in part identifying a portion of the video content from a video game and providing the portion of the video content from the video content to a communication device of player or spectator of the video game.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
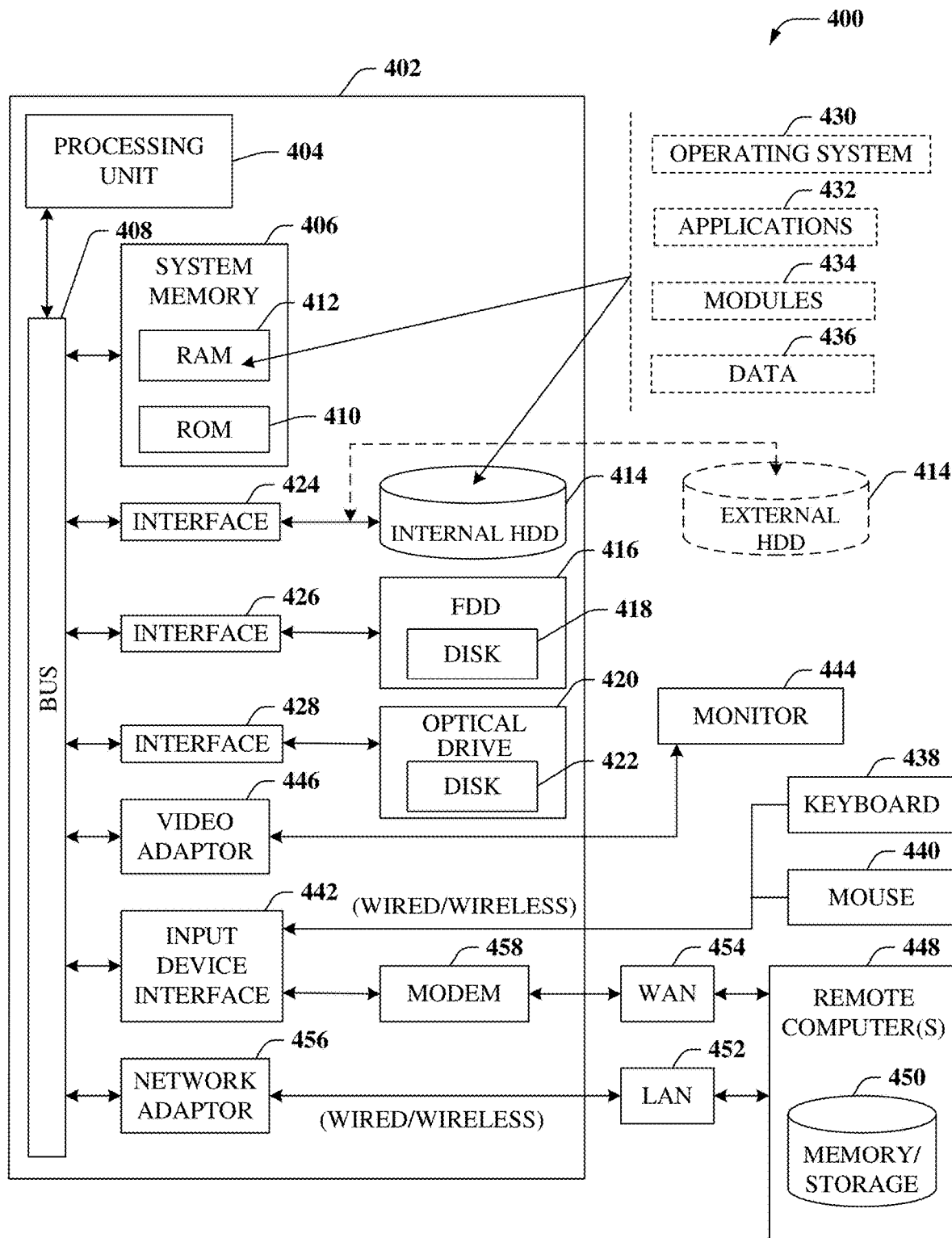
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in identifying a portion of the video content from a video game and providing the portion of the video content from the video game to a communication device of player or spectator of the video game. Further the communication device and server described in FIGS. 2A-2H can comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
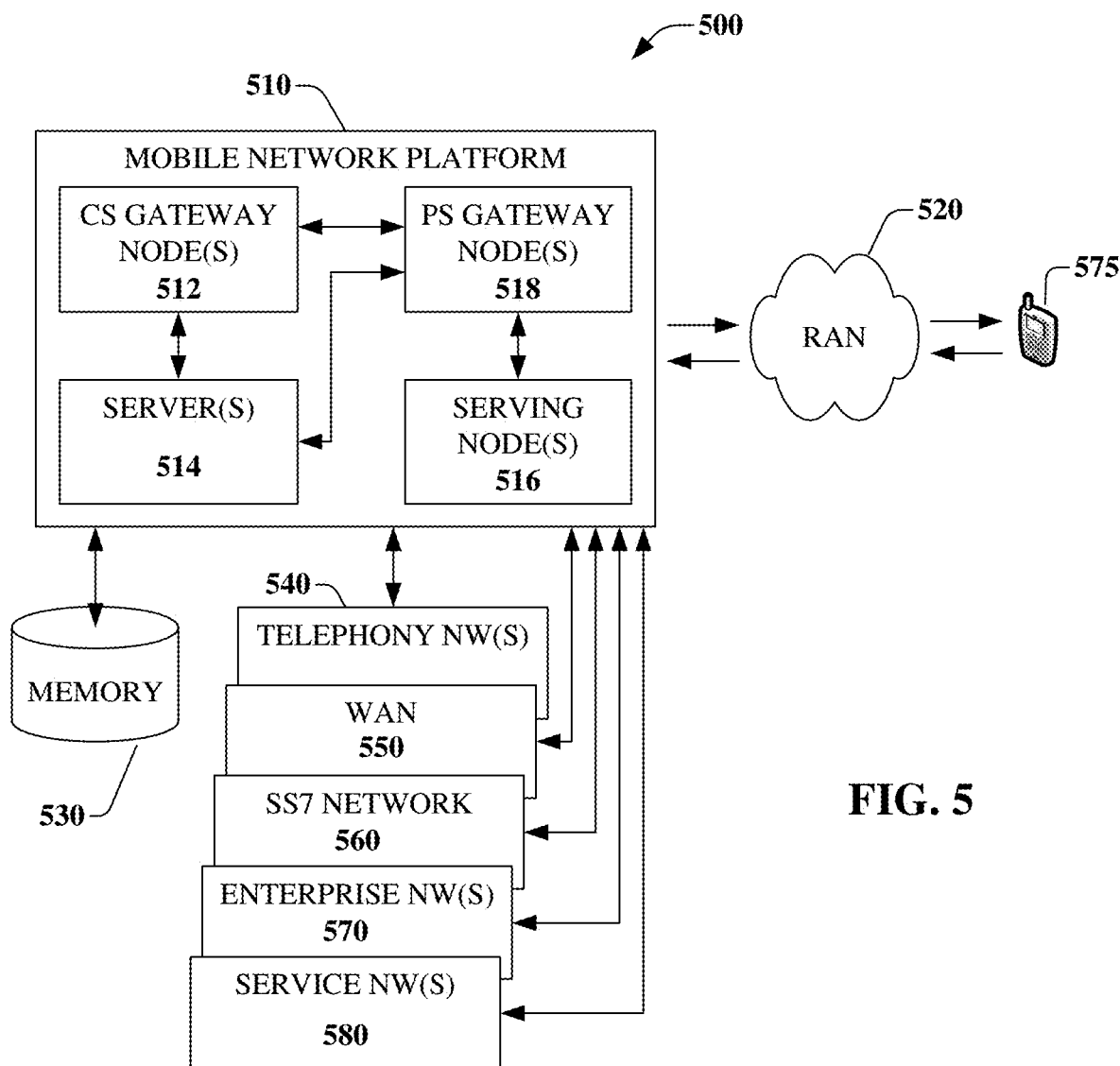
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part identifying a portion of the video content from the video game and providing the portion of the video content to a communication device of player or spectator of the video game.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
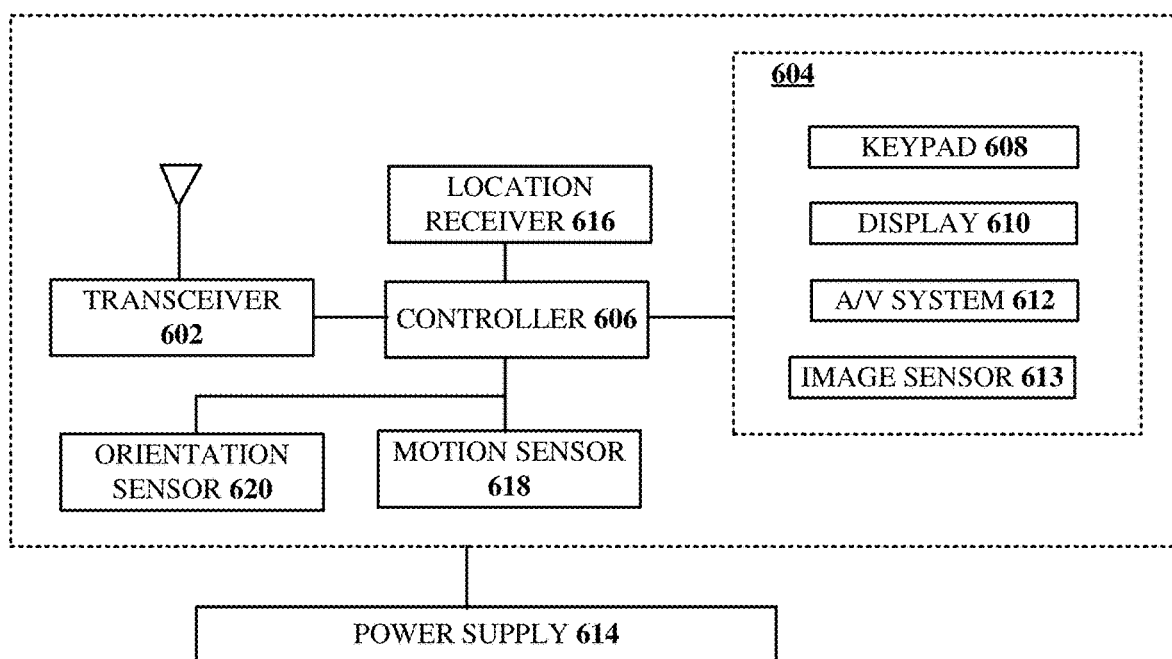
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part identifying a portion of the video content from a video game and providing the portion of the video content from the video game to a communication device of player or spectator of the video game. Further the communication device and server described in FIGS. 2A-2H can comprise computing device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
        obtaining a plurality of portions of video content from a video game from a group of video game servers associated with a video game provider;
        selecting a first portion of video content from the plurality of portions of the video content;
        providing the first portion of the video content to a group of devices associated with a group of viewers, wherein each device of the group of devices presents the first portion of the video content;
        obtaining popularity information from the group of devices according to feedback based on presenting the first portion of the video content to the group of devices associated with the group of viewers;
        determining that the popularity information satisfies a popularity threshold associated with the video content;
        determining a subject matter corresponding to the first portion of the video content; and
        identifying a second portion of the video content from the video game to be recorded according to the subject matter.

2. The device of claim 1, wherein the operations comprise providing the second portion of the video content to a first communication device of a previous player of the video game.

3. The device of claim 1, wherein the operations comprise determining a characteristic of the subject matter based on the popularity information.

4. The device of claim 3, wherein the characteristic of the first portion of the video content is associated to one of a current player of the video game, a strategy of the video game, a weapon of the video game, an object of the video game, a tactic of the video game, a group of controls of the video game, a popularity of first portion of the video content, or a combination thereof.

5. The device of claim 3, wherein the operations comprise providing a first recommendation for a first adjustment to the video game to a first computing device associated with the video game provider based on the characteristic of the first portion of the video content, wherein the first computing device adjusts first video content of the video game to a second video content according to the first adjustment.

6. The device of claim 3, wherein the operations comprise providing a second recommendation for an advertisement to a second computing device associated with an advertising entity based on the characteristic of the first portion of the video content, wherein the advertising entity provides the advertisement based on the characteristic of the first portion of the video content to be presented within the second portion of the video content from the video game.

7. The device of claim 3, wherein the operations comprise:
identifying a spectator of the video game based on the characteristic; and
providing the second portion of the video content to a second communication device associated with the spectator.

8. The device of claim 1, wherein the operations comprise:
identifying a group of players associated with the second portion of the video content; and
providing a third recommendation to a third computing device associated with the video game provider for a second adjustment to the video game based on a portion of the group of players associated with the first portion of the video content.

9. The device of claim 1, wherein the identifying of the second portion of the video content comprises identifying the second portion of the video content using a machine learning technique.

10. A machine-readable medium, comprising executable instructions that, when executed by a processing system including a processor, facilitate performance of operations, the operations comprising:
obtaining a plurality of portions of video content from a video game from a group of video game servers associated with a video game provider;
selecting a first portion of video content from the plurality of portions of the video content;
providing the first portion of the video content to a group of devices associated with a group of viewers, wherein each device of the group of devices presents the first portion of the video content;
obtaining popularity information from the group of devices according to feedback based on presenting the first portion of the video content to the group of devices associated with the group of viewers;
determining that the popularity information satisfies a popularity threshold associated with the video content;
determining a subject matter corresponding to the first portion of the video content;
identifying a second portion of the video content from the video game to be recorded according to the subject matter;
determining a characteristic of the subject matter based on the popularity information; and
providing a first recommendation for a first adjustment to the video game to a first computing device associated with the video game provider based on the characteristic of the first portion of the video content, wherein the first computing device adjusts first video content of the video game to a second video content according to the first adjustment.

11. The machine-readable medium of claim 10, wherein the characteristic of the first portion of the video content is associated to one of a current player of the video game, a strategy of the video game, a weapon of the video game, an object of the video game, a tactic of the video game, a group of controls of the video game, a popularity of first portion of the video content, or a combination thereof.

12. The machine-readable medium of claim 10, wherein the operations comprise providing a second recommendation for an advertisement to a second computing device associated with an advertising entity based on the characteristic of the first portion of the video content, wherein the advertising entity provides the advertisement based on the characteristic of the first portion of the video game to be presented within the video game.

13. The machine-readable medium of claim 10, wherein the operations comprise providing the second portion of the video content to a first communication device of a previous player of the video game.

14. The machine-readable medium of claim 10, wherein the operations comprise:
identifying a spectator of the video game based on the characteristic; and
providing the second portion of the video content to a second communication device associated with the spectator.

15. The machine-readable medium of claim 10, wherein the operations comprise:
identifying a group of players associated with the second portion of the video content; and
providing a third recommendation to a third computing device associated with the video game provider for a second adjustment to the video game based on a portion of the group of players associated with the first portion of the video content.

16. The machine-readable medium of claim 10, wherein the identifying of the second portion of the video content comprises identifying the second portion of the video content using a machine learning technique.

17. A method, comprising:
obtaining, by a processing system including a processor, a plurality of portions of video content from a video game from a group of video game servers associated with a video game provider;
selecting, by the processing system, a first portion of the video content from the plurality of portions of the video content;
providing, by the processing system, the first portion of the video content to a group of devices associated with a group of viewers, wherein each device of the group of devices presents the first portion of the video content;
obtaining, by the processing system, popularity information from the group of devices according to feedback based on presenting the first portion of the video content to the group of devices associated with the group of viewers;
determining, by the processing system, that the popularity information satisfies a popularity threshold associated with the video content;
determining, by the processing system, a subject matter corresponding to the first portion of the video content;

identifying, by the processing system, a second portion of the video content from the video game to be recorded according to the subject matter;

determining, by the processing system, a characteristic of the subject matter based on the popularity information; and providing, by the processing system, a first recommendation for an advertisement to a first computing device associated with an advertising entity based on the characteristic of the first portion of the video content, wherein the advertising entity provides the advertisement based on the characteristic of the first portion of the video game to be presented within the video game.

18. The method of claim 17, wherein the characteristic of the first portion of the video content is associated to one of a current player of the video game, a strategy of the video game, a weapon of the video game, an object of the video game, a tactic of the video game, a group of controls of the video game, a popularity of first portion of video content, or a combination thereof.

19. The method of claim 17, comprising providing, by the processing system, the second portion of the video content to a first communication device of a previous player of the video game.

20. The method of claim 17, comprising:

identifying, by the processing system, a spectator of the video game based on the characteristic; and providing, by the processing system, the second portion of the video game to a second communication device associated with the spectator.

* * * * *